Patented Mar. 22, 1932

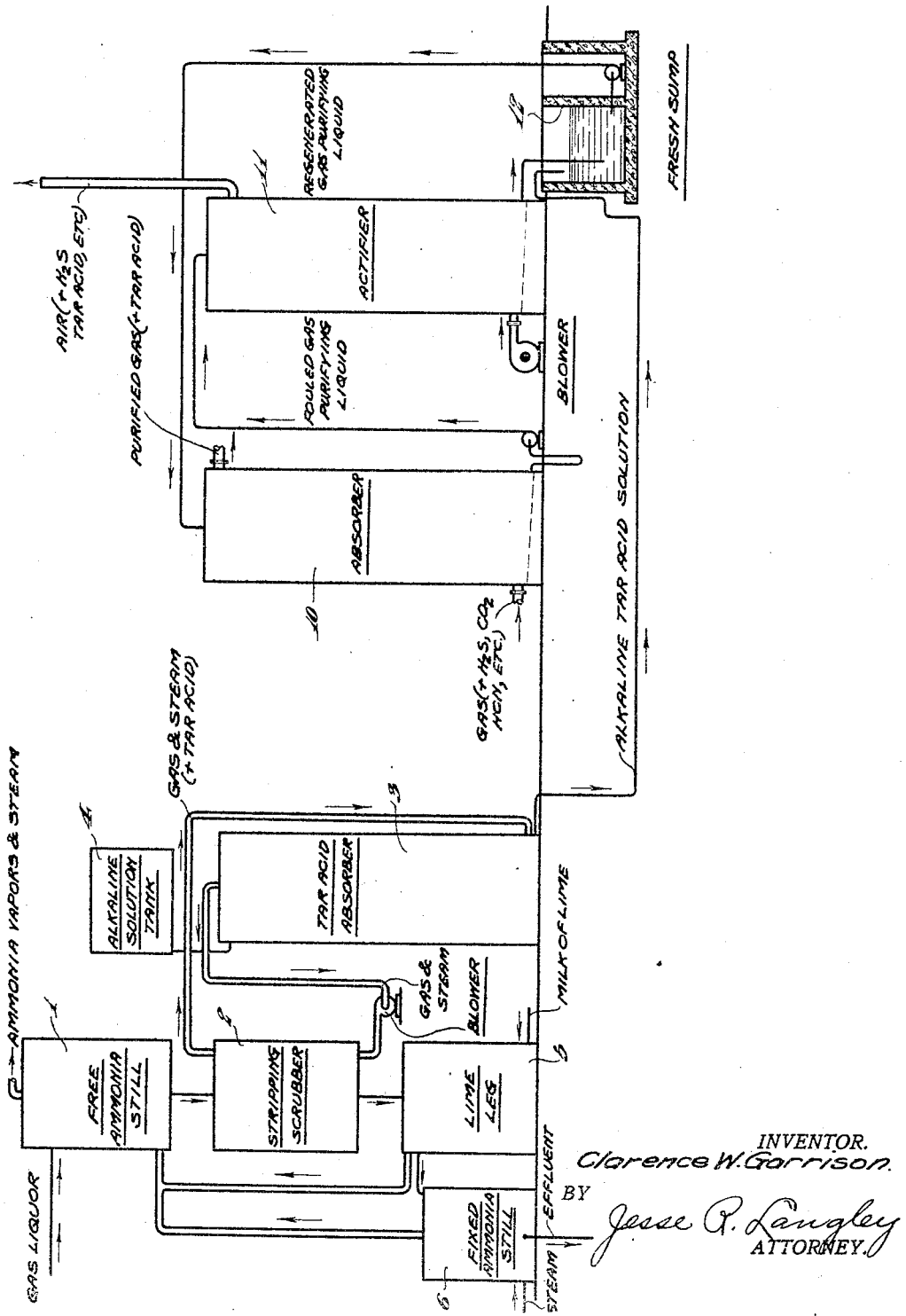

1,850,388

UNITED STATES PATENT OFFICE

CLARENCE W. GARRISON, OF PITTSBURGH, PENNSYLVANIA, ASSIGNOR TO THE KOPPERS COMPANY, A CORPORATION OF DELAWARE

GAS PURIFICATION

Application filed January 23, 1929. Serial No. 334,513.

My invention relates to the manufacture or preparation of fuel gas, such as coal gas, water gas, and the like.

My invention has particular relation to the removal of acidic impurities, such as hydrogen sulphide, hydrogen cyanide, carbon dioxide, and the like, from fuel gas and also to the treatment of the fuel gas or gas liquor produced in the manufacture of fuel gas for the removal of tar acid therefrom.

An object of my invention is to provide a process in which an agent employed for purification of fuel gas from acidic impurities is obtained from another operation incident to the manufacture of the same gas.

A second object of my invention is to provide a method of liberating tar acid from an agent to which it has been transferred from the gas or from gas liquor or other material.

My invention has for further objects such other operative advantages or results as may hereinafter be found to obtain.

In U. S. Patent No. 1,390,037 to Jacobson, there is described a process of purifying gas from acidic impurities, such as hydrogen sulphide, hydrogen cyanide, and carbon dioxide. This process consists briefly in recirculating an alkaline absorbent liquid through a cycle comprising an absorption stage wherein the impurities are removed from the gas by the liquid, and an actification stage wherein the impurities are removed from the liquid or oxidized to inert materials and the liquid regenerated for further use.

The liquid employed for this purpose ordinarily contains an alkali, such as sodium carbonate, or some other compound of an alkali-forming metal either with or without the addition of supplementary materials, such as iron oxide, and the like. Inasmuch as the gas being purified ordinarily contains considerable amounts of both hydrogen sulphide and carbon dioxide, there are generally present in the gas purifying liquid considerable amounts of sodium hydrosulphide and sodium bicarbonate. In some cases, however, the formation of sodium hydrosulphide is a mere transition stage as the sodium hydrosulphide is immediately oxidized by the presence of other materials such as iron oxide or the like, and in any case the presence of sodium hydrosulphide and also the presence of sodium bicarbonate varies considerably in different portions of the cycle.

As is well known, fuel gas made from coal contains tar acids, such as phenol, cresol, and the like. The removal and recovery of ammonia from such gas ordinarily results in the production of large quantities of gas liquor, and this liquor itself and the effluent liquor or still waste resulting from distillation thereof contain large amounts of tar acid or tar acid compound, such as ammonium or calcium phenolate.

Modern legislation is making it difficult, if not impossible, for the operator of a gas plant to discharge liquid containing any considerable amount of tar acid or tar acid compound into streams or other sources of community water supply. Consequently a number of processes have been developed for the removal of tar acid or tar acid compounds from gas liquor itself, ammonia still waste, tars, or analogous materials.

These processes are similar in that they ordinarily transfer the tar acid from the substance being treated to an alkaline solution by means of a suitable agent. The agent most commonly employed as the recipient for the tar acid is a solution of sodium hydroxide in which the tar acid is dissolved as sodium phenolate or other analogous tar acid compound.

It is occasionally uneconomical under conditions existing in gas plants to recover tar acid from such an alkaline solution thereof in salable form, but of course the material must be disposed of in some manner, and it has been found that where the solution is treated for the liberation of tar acid, as for example, by carbon dioxide or sodium carbonate or other suitable means, the resultant aqueous liquid contains materials such as sodium carbonate and sodium hydroxide which can be used to advantage in other gas manufacturing operations, for example, in a gas purification process of the character indicated above.

My invention contemplates the transfer of sodium phenolate solution obtained from a dephenolization operation directly to a gas purification process of the character indicated above. I have found that the presence of carbon dioxide in the gas either directly or indirectly through the presence of sodium bicarbonate in the recirculating liquid, and probably also the presence of sodium hydrosulphide in the gas purification liquid will accomplish the decomposition of the phenolate or other tar acid compound produced in the same plant, and result in the formation of alkaline substances, such as sodium carbonate, that are useful in the gas purification process.

I have also found that under ordinary circumstances the entire alkali requirement of the gas purification plant may be supplied by the phenolate solution alone.

I have also found that when the phenolate solution is disposed of in this manner the resultant tar acid may be volatilized by the gas being purified or the air or other gas used for regeneration of the absorbent liquid or both, and may thus be disposed of in a simple and unobjectionable manner. However, this does not preclude the separation and recovery of a considerable portion of the tar acid when so desired, as will be apparent from the detailed explanation of my process.

Inasmuch as it has been demonstrated that the presence of tar acid or compound thereof may exert a beneficial effect upon a gas purification process of the type indicated hereinabove by reason of its effect in inhibiting the formation of sodium thiosulphate or for some other reason, it is obvious that my process is not only not disadvantageous with respect to the gas purification process, but may actually result in a considerable advantage in this respect as well as in the other advantages herein enumerated.

In order that my invention may be clearly set forth and understood, I now describe with reference to the accompanying drawing the preferred manner in which it is performed and embodied. In the drawing, The single figure is a diagrammatic view of apparatus for removing tar acid from gas liquor and for purifying gas from acidic impurities.

Referring to the drawing, the removal of tar acid from gas liquor is accomplished by transferring the tar acid to an alkaline solution. In the specific instance illustrated this is done during the distillation of the gas liquor for the removal of ammonia by means of a recirculated inert gas as described and claimed in the co-pending application of Joseph A. Shaw, Serial Number 230,570, filed November 2, 1927, and also assigned to The Koppers Company.

According to this process the gas liquor is introduced to a free ammonia still 1 of the usual bell-and-tray type in which it is subjected to the action of a current of steam and ammonia. In the free ammonia still 1 substantially all of the free ammonia content of the gas liquor is removed, and the vapors escaping from the free ammonia still 1 pass to the usual condensing apparatus and are, in some cases, returned to the gas itself before it enters the saturators.

In the free still no especial attempt need be made to drive off the tar acid, although some tar acid is generally removed from the gas liquor at this point and returns to the gas. In general, however, it is preferred to operate the free ammonia still under such conditions and temperatures as will retain the bulk of the tar acids in the liquor after distillation of free ammonia. The liquor leaving the free ammonia still 1, and at a temperature approximate to or just below its boiling point, then passes to a stripping scrubber 2 where it is treated with a current of inert gas that is recirculated through the stripping scrubber in countercurrent to the gas liquor and through a tar acid absorber 3 in countercurrent with an alkaline solution capable of reacting with tar acid, for example, a solution of sodium hydroxide. This solution is supplied to the tar acid absorber 3 from a tank 4, either continuously or at intervals, but in such amount as to effect a thorough removal of tar acid from the recirculating gas.

The temperatures throughout the cycle of gas recirculation are maintained at or just below the boiling points of the liquids treated, in order to prevent condensation, the occurrence of which would increase the cost of operation greatly. Under these conditions the inert gas, which may be air or fuel gas or any other gas which does not introduce chemical complications, rapidly becomes saturated with steam, itself an inert gas with respect to the gas liquor. Since no condensation is allowered to occur, practically no dilution or evaporation of the liquids in the scrubber 2 and absorber 3 is effected. The only action which occurs is the transfer of tar acid from the liquor passing through the stripping scrubber 2 to the alkaline solution in the absorber 3, where it is retained in the form of non-volatile alkali phenolate and analogous compounds.

Sufficient time of contact and a sufficient rate of recirculation are maintained to insure that the liquor passing out of the stripping scrubber 2 is substantially entirely freed from tar acid. The liquor then passes to the usual lime leg 5 where it is treated with milk of lime to decompose fixed ammonia compounds and the limed liquor overflows into the fixed ammonia still 6 where it is treated with steam for the volatilization and removal of ammonia. The steam and ammonia vapors from the fixed ammonia still and lime leg pass to the free ammonia still, where they serve to accomplish the removal of the free ammonia originally present in the gas liquor.

My invention is not limited to this particular process of removing tar acids from gas liquor, but may be employed with any process in which the tar acids are eventually transferred to an alkaline solution. For example, a process of well known type in which ammonia liquor or still waste containing tar acids in free form is treated with a liquid, such as benzol or kerosene, that is recirculated through the liquid to be treated and a suitable alkaline solution.

In any of such processes, but especially in the particular process hereinabove described, it has been found that for the purpose of insuring an efficient removal of tar acid from the recirculating fluid it is highly desirable to employ a considerable excess of alkaline solution, for example, 100% of caustic soda. It will therefore be apparent that the alkaline liquid leaving the tar acid absorber 3 or equivalent apparatus will vary from a solution containing alkali phenolate alone to a solution containing about equal parts of free alkali and alkali phenolate. For example, it has been found, under some conditions, that a solution containing 10% by weight of caustic soda may be originally employed for retention of the tar acid and in such amount with respect to the tar acid that the resultant solution contains about 5% sodium hydroxide and 5% sodium phenolate or analogous tar acid compounds.

Instead of treating the sodium phenolate solution in a separate stage for removal and recovery of tar acid therefrom, by treatment with an acid, carbon dioxide, gas, sodium bicarbonate, or the like, according to my invention the phenolate solution is directly transferred to a liquid purification plant where it is advantageously employed for removing acid impurities, such as hydrogen sulphide, hydrogen cyanide, carbon dioxide, and the like, from fuel gas or other gas containing any or all of them.

In the drawing, the purification of the gas for this purpose is illustrated as it is accomplished by means of simple alkaline solutions. The gas to be purified is passed through an absorber 10 in countercurrent to a suitable alkaline absorbent solution which is recirculated through a cycle comprising principally the absorber 10 and actifier 11, where it is regenerated for further use.

When simple alkaline solutions are employed, the actification is readily accomplished by spraying the fouled gas purifying liquid over and through a countercurrent of gas, such as air, whereby the absorption reactions previously effected in the absorber 10 are reversed and the absorbed impurities are largely liberated and pass out into the atmosphere with the air or other gas used for actification.

It is customary in such plants to provide a sump 12 to receive the regenerated liquid leaving the actifier 11 and to serve as a general reservoir and make-up tank for the entire system.

The solution employed for the purification of gas and acidic impurities ordinarily comprises a solution of sodium carbonate, but due to the action of the impurities contained in the gas, considerable amounts of sodium bicarbonate, sodium hydrosulphide and sodium cyanide are present at various points in the recirculating system. Moreover, in addition to the principal reactions involved in the purification of the gas and regeneration of the solution various side reactions occur which may result, for example, in the formation of comparatively stable chemical compounds, such as sodium thiosulphate and sodium thiocyanate. The occurrence of these side reactions, as well as inevitable mechanical losses of the solution make it necessary to add sodium carbonate or its equivalent to the solution in such amount as to maintain the desired alkalinity and to account for mechanical losses and losses caused by side reactions.

According to my invention, the alkaline tar acid solution is transferred from the tar acid absorber 3 to the gas purification plant where it is advantageously added by simply discharging it as required into the sump 12.

The presence of sodium bicarbonate in the gas purification solution accomplishes the springing or liberation of tar acid from the alkaline solution, and this results in the formation of sodium carbonate which is the substance eventually required for the gas purification process. Under some circumstances, the bicarbonate present in the gas purifying solution at the point of addition of the phenolate solution will be insufficient to decompose all of the sodium phenolate and in this case, some of the sodium phenolate then passes into the absorber 10 where it is directly decomposed by carbon dioxide in the gas, or is decomposed by sodium bicarbonate only, formed by reaction of the carbon dioxide in the gas upon the sodium carbonate or sodium hydroxide present in the gas purification liquid.

I claim as my invention:

1. In the treatment of fuel gas containing hydrogen sulphide and carbon dioxide by means of an alkaline solution recirculated through an absorption stage in which said solution is brought into contact with the gas for removal of hydrogen sulphide therefrom and an actification stage in which the thereby fouled solution is aerated for removal of hydrogen sulphide previously removed from said gas, the improvement which comprises transferring phenol from gas liquor produced in the cooling of the gas to a solution of sodium hydroxide and adding the sodium phenolate thus produced to the recirculating solution as such to supply the alkali requirement of said solution, whereby said phenolate is decomposed by carbon dioxide removed from said gas with liberation of phenol, a portion of the liberated phenol being volatilized into the gas in the absorption stage, and the remaining portion being volatilized in remaining portions of the cycle of recirculation of said solution, so that appreciable amounts of phenol are maintained throughout said cycle.

2. In the treatment of fuel gas containing hydrogen sulphide and carbon dioxide by means of an alkaline solution recirculated through an absorption stage in which said solution is brought into contact with the gas for removal of hydrogen sulphide therefrom and an actification stage in which the thereby fouled solution is aerated for removal of hydrogen sulphide previously removed from said gas, the improvement which comprises transferring phenol from gas liquor produced in the cooling of the gas to a solution containing a sufficient amount of sodium hydroxide to satisfy the alkali requirement of said recirculating solution, and adding the solution comprising sodium phenolate thus produced, without prior removal of phenol therefrom, to said recirculating solution, whereby said phenolate is decomposed by carbon dioxide removed from said gas and appreciable amounts of the thereby liberated phenol are maintained throughout the cycle of recirculation of said solution, which volatilization of said phenol occurs simultaneously at a rate corresponding to that at which said phenolate is added.

In testimony whereof, I have hereunto subscribed my name this 22nd day of January, 1929.

CLARENCE W. GARRISON.